(12) United States Patent
Wengerter et al.

(10) Patent No.: US 8,428,007 B2
(45) Date of Patent: Apr. 23, 2013

(54) RESOURCE ALLOCATION SIZE DEPENDENT TRANSPORT BLOCK SIZE SIGNALING

(75) Inventors: Christian Wengerter, Langen (DE); Hidetosi Suzuki, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 327 days.

(21) Appl. No.: 12/934,052

(22) PCT Filed: Mar. 10, 2009

(86) PCT No.: PCT/EP2009/001711
§ 371 (c)(1), (2), (4) Date: Dec. 16, 2010

(87) PCT Pub. No.: WO2009/118097
PCT Pub. Date: Oct. 1, 2009

(65) Prior Publication Data
US 2011/0085508 A1 Apr. 14, 2011

(30) Foreign Application Priority Data
Mar. 25, 2008 (EP) .................................... 08005518

(51) Int. Cl.
H04W 4/00 (2009.01)
(52) U.S. Cl.
USPC ......................................... 370/328; 370/329
(58) Field of Classification Search .................. 370/328, 370/329
See application file for complete search history.

(56) References Cited

U.S. PATENT DOCUMENTS
2007/0189304 A1* 8/2007 Rosa ......................... 370/395.21
2007/0232318 A1* 10/2007 Nobukiyo ...................... 455/450

FOREIGN PATENT DOCUMENTS
EP 1 389 848 2/2004
EP 1 826 939 8/2007

OTHER PUBLICATIONS

International Search Report dated Nov. 9, 2009.
3GPP TSG RAN WG1#47bis, "Transport Block Size Signalling for 1/28Mcps TDD EUL," CATT, Tdoc R1-070299, Jan. 2007, pp. 1-3.
TSG-RAN WG1 #50, "Notes from offline discussions on PDCCH contetns," Ericsson, R1-073870, Aug. 2007, pp. 1-3.
3GPP TSG-RAN WG2 Meeting #32, "Proposed CR to TS25.321 on Re-ordering Mechanism," Motorola, R2-022621, Sep. 2002, pp. 1-11.
3GPP TS 25.321 V6.8.0, "Medium Access Control (MAC) protocol specification (Release 6)," Mar. 2006, pp. 1-91.
3GPP TSG RAN WG1 Lte Ad Hoc, "Coding Scheme of L1/L2 Control Channel for E-UTRA Downlink," NTT DoCOMo, Fujitsu, Mitsubishi Electric, NEC, Sharp, Toshiba Corporation, R1-061672, Jun. 2006, pp. 1-19.
3GPP TR 25.814 V7.1.0, "Physical layer aspects for evolved Universal Terrestrial Radio Access (UTRA) (Release 7)," Sep. 2006, pp. 1-132.
3GPP TSG RAN WG1 Meeting #46, "Comparison between RB-level and Sub-carrier-level Distributed Transmission for Shared Data Channel in E-UTRA Downlink," Ntt DoCoMo, et al., R1-062089, Aug. 28-Sep. 1, 2006, pp. 1-14.
3GPP TSG-RAN WG1 #52, "PDCCH Contents," R1-081139, Feb. 2008, pp. 1-7.

(Continued)

Primary Examiner — Kenny Lin
(74) Attorney, Agent, or Firm — Dickinson Wright PLLC

(57) ABSTRACT

The invention relates to a method for providing control signalling associated to a transport block in a mobile communication system. Furthermore, the invention also provides a receiving apparatus and a transmitting apparatus that performs the methods proposed herein. In order to obtain a control signaling mechanism that is increasing the number of available transport block sizes that can be used for transmissions of a transport block, without increasing the control signaling overhead, the invention suggests to apply a partitioning to the transport block size indices defined over the entire range of applicable resource allocation sizes and modulation and coding scheme levels, wherein the transport blocks size indicator is selecting the transport block size index from a respective partition depending on the resource allocation size.

30 Claims, 7 Drawing Sheets

OTHER PUBLICATIONS

3GPP TS 25.308 V7.4.0, "High Speed Downlink Packet Access (HSDPA); Overall description; Stage 2 (Release 7)," Sep. 2007, pp. 1-50.

H. Holma and A. Toskala, "WCDMA for UMTS, Radio Access for Third Generation Mobile Communications," Third Edition, John Wiley & Sons, Ltd., 2004, Chapters 11.1-11.5, pp. 307-313.

3GPP TS 25.212 V7.6.0, "Multiplexing and channel coding (FDD) (Release 7)," Sep. 2007, pp. 1-103.

3GPP TS 36.213 V8.1.0, "Evolved Universal Terrestrial Radio Access (E-UTRA); Physical layer procedures (Release 8)," Nov. 2007, pp. 1-17.

3GPP TS 25.321, V8.0.0, "Medium Access Control (MAC) protocol specification (Release 8)," Dec. 2007, pp. 1-146.

3GPP TS 36.211 V8.1.0, "Physical channels and modulation," Nov. 2007, pp. 1-54.

* cited by examiner

RESOURCE ALLOCATION SIZE DEPENDENT TRANSPORT BLOCK SIZE SIGNALING

FIELD OF THE INVENTION

The invention relates to a method for providing control signalling associated to a transport block in a mobile communication system. Furthermore, the invention also provides a receiving apparatus and a transmitting apparatus that perform the methods proposed herein.

TECHNICAL BACKGROUND

Packet-Scheduling and Shared Channel Transmission

In wireless communication systems employing packet-scheduling, at least part of the air-interface resources are assigned dynamically to different users (mobile stations—MS or user equipments—UE). Those dynamically allocated resources are typically mapped to at least one Physical Uplink or Downlink Shared CHannel (PUSCH or PDSCH). A PUSCH or PDSCH may for example have one of the following configurations:

- One or multiple codes in a CDMA (Code Division Multiple Access) system are dynamically shared between multiple MS.
- One or multiple subcarriers (subbands) in an OFDMA (Orthogonal Frequency Division Multiple Access) system are dynamically shared between multiple MS.
- Combinations of the above in an OFCDMA (Orthogonal Frequency Code Division Multiplex Access) or a MC-CDMA (Multi Carrier-Code Division Multiple Access) system are dynamically shared between multiple MS.

FIG. 1 shows a packet-scheduling system on a shared channel for systems with a single shared data channel. A sub-frame (also referred to as a time slot) reflects the smallest interval at which the scheduler (e.g. the Physical Layer or MAC Layer Scheduler) performs the dynamic resource allocation (DRA). In FIG. 1, a TTI (transmission time interval) equal to one sub-frame is assumed. It should be born noted that generally a TTI may also span over multiple sub-frames.

Further, the smallest unit of radio resources (also referred to as a resource block or resource unit), which can be allocated in OFDM systems, is typically defined by one sub-frame in time domain and by one subcarrier/subband in the frequency domain. Similarly, in a CDMA system this smallest unit of radio resources is defined by a sub-frame in the time domain and a code in the code domain.

In OFCDMA or MC-CDMA systems, this smallest unit is defined by one sub-frame in time domain, by one subcarrier/subband in the frequency domain and one code in the code domain. Note that dynamic resource allocation may be performed in time domain and in code/frequency domain.

The main benefits of packet-scheduling are the multi-user diversity gain by time domain scheduling (TDS) and dynamic user rate adaptation.

Assuming that the channel conditions of the users change over time due to fast (and slow) fading, at a given time instant the scheduler can assign available resources (codes in case of CDMA, subcarriers/subbands in case of OFDMA) to users having good channel conditions in time domain scheduling. Specifics of DRA and Shared Channel Transmission in OFDMA Additionally to exploiting multi-user diversity in time domain by Time Domain Scheduling (TDS), in OFDMA multi-user diversity can also be exploited in frequency domain by Frequency Domain Scheduling (FDS). This is because the OFDM signal is in frequency domain constructed out of multiple narrowband subcarriers (typically grouped into subbands), which can be assigned dynamically to different users. By this, the frequency selective channel properties due to multi-path propagation can be exploited to schedule users on frequencies (subcarriers/subbands) on which they have a good channel quality (multi-user diversity in frequency domain).

For practical reasons in an OFDMA system the bandwidth is divided into multiple subbands, which consist out of multiple subcarriers. I.e. the smallest unit on which a user may be allocated would have a bandwidth of one subband and a duration of one slot or one sub-frame (which may correspond to one or multiple OFDM symbols), which is denoted as a resource block (RB). Typically, a subband consists of consecutive subcarriers. However, in some case it is desired to form a subband out of distributed non-consecutive subcarriers. A scheduler may also allocate a user over multiple consecutive or non-consecutive subbands and/or sub-frames.

For the 3GPP Long Term Evolution (3GPP TR 25.814: "Physical Layer Aspects for Evolved UTRA", Release 7, v. 7.1.0, October 2006—available at http://www.3gpp.org and incorporated herein by reference), a 10 MHz system (normal cyclic prefix) may consist out of 600 subcarriers with a sub-carrier spacing of 15 kHz. The 600 subcarriers may then be grouped into 50 subbands (a 12 adjacent subcarriers), each subband occupying a bandwidth of 180 kHz. Assuming, that a slot has a duration of 0.5 ms, a resource block (RB) spans over 180 kHz and 0.5 ms according to this example.

In order to exploit multi-user diversity and to achieve scheduling gain in frequency domain, the data for a given user should be allocated on resource blocks on which the users have a good channel condition. Typically, those resource blocks are close to each other and therefore, this transmission mode is in also denoted as localized mode (LM).

An example for a localized mode channel structure is shown in FIG. 2. In this example neighboring resource blocks are assigned to four mobile stations (MS1 to MS4) in the time domain and frequency domain. Each resource block consists of a portion for carrying Layer 1 and/or Layer 2 control signaling (L1/L2 control signaling) and a portion carrying the user data for the mobile stations.

Alternatively, the users may be allocated in a distributed mode (DM) as shown in FIG. 3. In this configuration, a user (mobile station) is allocated on multiple resource blocks, which are distributed over a range of resource blocks. In distributed mode a number of different implementation options are possible. In the example shown in FIG. 3, a pair of users (MSs 1/2 and MSs 3/4) shares the same resource blocks. Several further possible exemplary implementation options may be found in 3GPP RAN WG#1 Tdoc R1-062089, "Comparison between RB-level and Sub-carrier-level Distributed Transmission for Shared Data Channel in E-UTRA Downlink", August 2006 (available at http://www.3gpp.org and incorporated herein by reference).

It should be noted, that multiplexing of localized mode and distributed mode within a sub-frame is possible, where the amount of resources (RBs) allocated to localized mode and distributed mode may be fixed, semi-static (constant for tens/hundreds of sub-frames) or even dynamic (different from sub-frame to sub-frame).

In localized mode as well as in distributed mode in—a given sub-frame—one or multiple data blocks (which are inter alia referred to as transport-blocks) may be allocated separately to the same user (mobile station) on different resource blocks, which may or may not belong to the same service or Automatic Repeat reQuest (ARQ) process. Logically, this can be understood as allocating different users.

L1/L2 Control Signaling

In order to provide sufficient side information to correctly receive or transmit data in systems employing packet scheduling, so-called L1/L2 control signaling (Physical Downlink Control CHannel—PDCCH) needs to be transmitted. Typical operation mechanisms for downlink and uplink data transmission are discussed below.

Downlink Data Transmission

Along with the downlink packet data transmission, in existing implementations using a shared downlink channel, such as 3GPP-based High Speed Data Packet Access (HS-DPA), L1/L2 control signaling is typically transmitted on a separate physical (control) channel.

This L1/L2 control signaling typically contains information on the physical resource(s) on which the downlink data is transmitted (e.g. subcarriers or subcarrier blocks in case of OFDM, codes in case of CDMA). This information allows the mobile station (receiver) to identify the resources on which the data is transmitted. Another parameter in the control signaling is the transport format used for the transmission of the downlink data.

Typically, there are several possibilities to indicate the transport format. For example, the transport block size of the data (payload size, information bits size), the Modulation and Coding Scheme (MCS) level, the Spectral Efficiency, the code rate, etc. may be signaled to indicate the transport format (TF). This information (usually together with the resource allocation) allows the mobile station (receiver) to identify the information bit size, the modulation scheme and the code rate in order to start the demodulation, the de-rate-matching and the decoding process. In some cases the modulation scheme maybe signaled explicitly.

In addition, in systems employing Hybrid ARQ (HARQ), HARQ information may also form part of the L1/L2 signaling. This HARQ information typically indicates the HARQ process number, which allows the mobile station to identify the Hybrid ARQ process on which the data is mapped, the sequence number or new data indicator, allowing the mobile station to identify if the transmission is a new packet or a retransmitted packet and a redundancy and/or constellation version. The redundancy version and/or constellation version tells the mobile station, which Hybrid ARQ redundancy version is used (required for de-rate-matching) and/or which modulation constellation version is used (required for demodulation)

A further parameter in the HARQ information is typically the UE Identity (UE ID) for identifying the mobile station to receive the L1/L2 control signaling. In typical implementations this information is used to mask the CRC of the L1/L2 control signaling in order to prevent other mobile stations to read this information.

The table below (Table 1) illustrates an example of a L1/L2 control channel signal structure for downlink scheduling as known from 3GPP TR 25.814 (see section 7.1.1.2.3—FFS=for further study):

TABLE 1

| | Field | Size | Comment |
|---|---|---|---|
| Cat. 1 (resource indication) | ID (UE or group specific) | [8-9] | Indicates the UE (or group of UEs) for which the data transmission is intended |
| | Resource assignment | FFS | Indicates which (virtual) resource units (and layers in case of multi-layer transmission) the UE(s) shall demodulate. |
| | Duration of assignment | 2-3 | The duration for which the assignment is valid, could also be used to control the TTI or persistent scheduling. |
| Cat. 2 (transport format) | Multi-antenna related information | FFS | Content depends on the MIMO/beamforming schemes selected. |
| | Modulation scheme | 2 | QPSK, 16QAM, 64QAM. In case of multi-layer transmission, multiple instances may be required. |
| | Payload size | 6 | Interpretation could depend on e.g. modulation scheme and the number of assigned resource units (c.f. HSDPA). In case of multi-layer transmission, multiple instances may be required. |
| Cat. 3 (HARQ) | If asynchronous hybrid ARQ is adopted | Hybrid ARQ process number — 3 | Indicates the hybrid ARQ process the current transmission is addressing. |
| | | Redundancy version — 2 | To support incremental. redundancy |
| | | New data indicator — 1 | To handle soft buffer clearing. |
| | If synchronous hybrid ARQ is adopted | Retransmission sequence number — 2 | Used to derive redundancy version (to support incremental redundancy) and 'new data indicator' (to handle soft buffer clearing). |

Uplink Data Transmission

Similarly, also for uplink transmissions, L1/L2 signaling is provided on the downlink to the transmitters in order to inform them on the parameters for the uplink transmission.

The table below (Table 2) illustrates an example of a L1/L2 control channel signal structure for uplink scheduling as known from 3GPP TR 25.814 (see section 7.1.1.2.3— FFS=for further study):

TABLE 2

|  | Field | Size | Comment |
| --- | --- | --- | --- |
| Resource assignment | ID (UE or group specific) | [8-9] | Indicates the UE (or group of UEs) for which the grant is intended |
|  | Resource assignment | FFS | Indicates which uplink resources, localized or distributed, the UE is allowed to use for uplink data transmission. |
|  | Duration of assignment | 2-3 | The duration for which the assignment is valid. The use for other purposes, e.g., to control persistent scheduling, 'per process' operation, or TTI length, is FFS. |
| TF | Transmission parameters | FFS | The uplink transmission parameters (modulation scheme, payload size, MIMO-related information, etc) the UE shall use. If the UE is allowed to select (part of) the transport format, this field sets determines an upper limit of the transport format the UE may select. |

Essentially, the L1/L2 control channel signal is partly similar to the one for downlink transmissions. It typically indicates the physical resource(s) on which the UE should transmit the data (e.g. subcarriers or subcarrier blocks in case of OFDM, codes in case of CDMA) and a transport format the mobile station should use for uplink transmission. Further, the L1/L2 control information may also comprise Hybrid ARQ information, indicating the HARQ process number, the sequence number or new data indicator, and further the redundancy and/or constellation version. In addition, there may be a UE Identity (UE ID) comprised in the control signaling.

Variants

There are several different flavors how to exactly transmit the information pieces mentioned above. Moreover, the L1/L2 control information may also contain additional information or may omit some of the information. For example, the HARQ process number may not be needed in case of using no or a synchronous HARQ protocol. Similarly, the redundancy and/or constellation version may not be needed, if for example Chase Combining is used (i.e. always the same redundancy and/or constellation version is transmitted) or if the sequence of redundancy and/or constellation versions is pre-defined.

Another variant may be to additionally include power control information in the control signaling or MIMO related control information, such as e.g. pre-coding information. In case of multi-codeword MIMO transmission transport format and/or HARQ information for multiple code words may be included.

In case of uplink data transmission, part or all of the information listed above may be signaled on uplink, instead of on the downlink. For example, the base station may only define the physical resource(s) on which a given mobile station shall transmit. Accordingly, the mobile station may select and signal the transport format, modulation scheme and/or HARQ parameters on the uplink. Which parts of the L1/L2 control information is signaled on the uplink and which proportion is signaled on the downlink is typically a design issue and depends on the view how much control should be carried out by the network and how much autonomy should be left to the mobile station.

Another, more recent suggestion of a L1/L2 control signaling structure for uplink and downlink transmission may be found in 3GPP TSG-RAN WG1 #50 Tdoc. R1-073870, "Notes from offline discussions on PDCCH contents", August 2007, and in 3GPP TSG-RAN WG1 #52 Tdoc R1-081139, "PDCCH contents", February 2008, available at http://www.3gpp.org and incorporated herein by reference.

As indicated above, L1/L2 control signaling has been defied for systems that are already deployed to in different countries, such as for example, 3GPP HSDPA. For details on 3GPP HSDPA it is therefore referred to 3GPP TS 25.308, "High Speed Downlink Packet Access (HSDPA); Overall description; Stage 2", version 7.4.0, September 2007 (available at http://www.3gpp.org) and Harri Holma and Antti Toskala, "WCDMA for UMTS, Radio Access For Third Generation Mobile Communications", Third Edition, John Wiley & Sons, Ltd., 2004, chapters 11.1 to 11.5, for further reading.

As described in section 4.6 of 3GPP TS 25.212, "Multiplexing and Channel Coding (FDD)", version 7.6.0, September 2007 (available at http://www.3gpp.org) in HSDPA the "Transport Format" (TF) (Transport-block size information (6 bits)), the "Redundancy and constellation Version" (RV/CV) (2 bits) and the "New Data Indicator" (NDI) (1 bit) are signaled separately by in total 9 bits. It should be noted that the NDI is actually serving as a 1-bit HARQ Sequence Number (SN), i.e. the value is toggled with each new transport-block to be transmitted.

Details on Resource Block Allocation Signaling in LTE/SAE for Downlink

Each control channel, referred to as PDCCH, includes a resource allocation field that is indicating the allocated resources. According to 3GPP TR 36.213, "Physical layer procedures", version 8.1.0, section 7.1 (available at http://www.3gpp.org and incorporated herein by reference) the resource allocation field consists of two parts, a type field and information consisting of the actual resource allocation.

PDCCHs with the resource allocation field of which is indicating a type 0 and type 1 resource allocation have the same format (e.g. formats 1 or 2) and are distinguished from each other via the type field. For system bandwidth less than or equal to 10 Physical Resource Blocks (PRBs) the resource allocation field in each PDCCH contains only information of the actual resource allocation in terms of a bitmap (allocation type 0). PDCCHs with the resource allocation field of which is indicating type 2 resource allocation have a different format from PDCCHs the resource allocation field of which is indicating a type 0 or type 1 resource allocation.

In resource allocations of type 0, a bitmap indicates the resource block groups that are allocated to the scheduled UE. The size of the group is a function of the system bandwidth that is shown in table 3 below (which is a copy of Table 7.1.1-1 in 3GPP TR 36.213):

TABLE 3

| RBG Size (P) | System Bandwidth $N_{RB}^{DL}$ |
|---|---|
| 1 | ≦10 |
| 2 | 11-26 |
| 3 | 27-64 |
| 4 | 64-110 |

According to resource allocations of type 1, a bitmap is indicating to a scheduled mobile terminal (UE) the resource blocks from the set of resource blocks from one of the P resource block group subsets where P is the resource block group size associated with the system bandwidth that is shown in the table above.

In resource allocations of type 2, the resource allocation information indicates to a scheduled UE a set of contiguously allocated physical or virtual resource blocks depending on the setting of a 1-bit flag carried on the associated control channel, PDCCH. The physical resource block allocations can vary from a single physical resource block up to a maximum number of physical resource blocks spanning the system bandwidth. For virtual resource block allocations the resource allocation information consists of a starting virtual resource block number and a number of consecutive virtual resource blocks where each virtual resource block is mapped to multiple non-consecutive physical resource blocks.

A type 2 resource allocation field consists of a resource indication value (RIV) corresponding to a starting resource block ($RB_{start}$) and a length in terms of contiguously allocated resource blocks ($L_{CRBs}$). According to 3GPP TR 36.213, the resource indication value is defined as follows if $(L_{CRBs}-1) \leq \lfloor N_{RB}^{DL}/2 \rfloor$ then $RIV = N_{RB}^{DL}(L_{CRBs}-1) + RB_{start}$ else $RIV = N_{RB}^{DL}(N_{RB}^{DL}-L_{CRBs}+1) + (N_{RB}^{DL}-1-RB_{start})$ Details of the Transport Format (TF) Signaling Some transport block size (TBS) based signaling schemes, which are currently discussed for 3GPP LTE systems, are based on the TBS signaling defined in HSDPA, which is defined in section 9.2.3 in 3GPP TS 25.321 "Medium Access Control (MAC) protocol specification (Release 8)", version 8.0.0 (available at http://www.3gpp.org).

The basic principle of the scheme is that a TBS superset of size N is defined. The values of the superset are sorted in e.g. ascending order (TBS (n)<TBS (n+1)) and the TBS values are spaced linearly in log-domain (for example see MATLAB code below (MATLAB® is computer program offering an interactive environment and a high-level language enabling engineers to perform computationally intensive tasks faster than with traditional programming languages such as C, C++, and Fortran. The computer program is offered by The Mathworks Inc. (see http://www.mathworks.com)):

TBS=logspace (log 10(minTBS), log 10(maxTBS), N);

or logTBS=log 10(minTBS): diffLogTBS: log 10(maxTBS); TBS=10.^(logTBS);

Though not yet having been discussed in the 3GPP working group, the inventors have found and assumed in making this invention that the scheme of HSDPA may be adapted for use in LTE as follows. For a given resource allocation size RB_size (e.g. allocations between 1 and 100 resource blocks) a given number of TBS values (M), from which can be selected on a PDCCH (e.g. 29 values) is predefined. Thus, for a given allocation size a TBS from a certain range (size M) of the superset of size N can be signaled. One way of defining the ranges is defining e.g. the lowest TBS superset index nmin (RB_size) defining the lowest MCS level (smallest TBS) for a given RB allocation size. Then any of the values of the TBS superset up to nmax=nmin (RB_size)+M−1 can be signaled. Alternatively, e.g. the largest TBS superset index nmax (RB_size) defining the largest MCS level (largest TBS) for a given RB allocation size can be chosen. The TBS ranges consist out of consecutive indices of the superset.

FIG. 4 exemplarily illustrates a simple example for TBS superset and TBS range signaling when applying the principles of the HSDPA signaling scheme in 3GPP TS 25.321. The figure is intended to exemplarily illustrate the basic principle of defining a TBS superset containing all possible transport block sizes for the applicable range of resource allocation sizes (x-axis) and assuming MCS levels between {QPSK; code rate 0.125} and [64-QAM; code rate 0.9]. For simplicity and to have a better overview, an example of having 22 different transport block sizes is shown, where for each resource allocation size it may be selected from a range of 12 transport block sizes of the superset.

FIG. 5 shows another example for the definition of a TBS superset and TBS range signaling with numbers being assumed for 3GPP LTE systems when applying the principles of the HSDPA signaling scheme in 3GPP TS 25.321 to a 3GPP LTE system. Essentially, FIG. 5 is similar to FIG. 4, except for the TBS superset defining 70 transport block sizes and distinguishing 29 transport block sizes per resource allocation size.

Using the scheme described above and assuming a certain range of modulation and coding scheme (MCS) levels to be supported (similar/identical for all allocation sizes, e.g. from QPSK rate ⅛ up to 64-QAM rate 0.9) and a given number M of transport block size values from which can be chosen on the PDCCH results in a certain size N of the superset. It further results in a certain granularity of the transport block size values, which in turn results in a certain percentage of MAC padding overhead assuming that the MAC packets can have any arbitrary size.

At present, the 3GPP working group considers to use a 5-bit field for TBS signaling on the PDCCH for 3GPP LTE/SAE systems. Further, three entries are to be reserved resulting in a number of $M=2^5-3=29$ transport block sizes or modulation and coding scheme levels that can be selected. Furthermore assuming that the resource block allocation size is in the range of 1 to 100 and the MCS levels ranging from QPSK rate ⅛ up to 64-QAM rate 0.9, this results in a superset size of N=70 and an average (maximum) MAC padding of 5.8% (11.6%), which is undesirable.

SUMMARY OF THE INVENTION

One object of the invention is to suggest a control signaling mechanism that is increasing the number of available transport block sizes that can be used for transmissions of a transport block, without increasing the control signaling overhead. A more specific object is to design this mechanism so as to allow for reducing the MAC padding overhead (difference in bits between MAC protocol data unit and selected transport block size, assuming that the transport block size is larger or equal to the MAC protocol data unit size) that has to be added for filling transport blocks as would be implied by the L1/L2 control signaling presently discussed in the 3GPP working group.

The object is solved by the subject matter of the independent claims. Advantageous embodiments of the invention are subject matters of the dependent claims.

One main aspect of the invention is to suggest a new signaling scheme for the transport block size of a transmitted transport block. According to this aspect the transport block size index is determined from a range of non-consecutive transport block size indices of a transport block size superset (also referred to as "mother table"), the range depending on the signaled resource allocation size. This allows increasing the number of transport block size indices and thus the number of available transport block sizes for the transport blocks that can be used for the transmission of transport blocks without the need to spend additional overhead for the signaling of the transport block size. The information on the transport block size (index) within the control channels is named transport block size indicator. Furthermore, the resource allocation size, e.g. in terms of the number of resource blocks allocated for the transmission of a transport block is indicated by a so-called resource allocation size indicator.

In accordance with this aspect of the invention, and in accordance with one embodiment of the invention, a method for receiving a transport block in a mobile communication system is suggested. A receiving apparatus, such that a mobile terminal or base station—depending on whether downlink or uplink transmissions are considered—, receives a control channel comprising a transport block size indicator and a resource allocation size indicator for a transmission of a transport block destined to the receiving apparatus.

The receiving apparatus further determines a transport block size index based on the resource allocation size indicator and the transport block size indicator. Thereby, the resource allocation size indicator determines the minimum or the maximum transport block size index of a subset of non-consecutive transport block size indices of all available transport block size indices. The transport block size indicator determines the transport block size index from the subset of non-consecutive transport block size indices corresponding to the transport block size of the transport block.

Having determined the applied transport block size index, the receiving apparatus can extract the transport block from the shared channel based on the resource allocation size indicator defining the number of resource blocks used to transmit the transport block and based on the selected transport block size index indicating the size of the transport block.

In this embodiment, the transport block size index can be for example determined based on a function of the transport block size indicator and the resource allocation size indicator. For instance, the transport block size index is determined from the subset of non-consecutive transport block size indices by adding an offset defined by the transport block size indicator to the minimum transport block size index (which is depending on the resource allocation size) of the subset of non-consecutive transport block size indices. Alternatively, the transport block size index could also be determined from the subset of non-consecutive transport block size indices by subtracting an offset defined by the transport block size indicator from the maximum transport block size index of the subset of non-consecutive transport block size indices.

The selection of the transport block size index from the subset of non-consecutive transport block size indices may be for example implemented by defining the offset to be a multiple of an integer number n, where n>1. Hence, in this example the transport block size indicator is selecting one out of every $n^{th}$ transport block size index between (and including) the minimum and the maximum transport block size index according to the resource allocation size. In other words, for the given resource allocation size, the subset of non-consecutive transport block size indices consist of every $n^{th}$ transport block size index between (and including) the minimum and the maximum transport block size index according to the resource allocation size.

It should be noted that, in general, the subset of non-consecutive transport block size indices does not necessarily have to consist of multiples of a given integer number. Another possibility is that the offset is a multiple of two or more integer numbers, e.g. n>1 and m>1, n≠m. Furthermore, it should be noted that depending on how the subsets of the (non-consecutive) transport block size indices are defined, the transport block size indices of different subsets of the transport block size indices for at least two (adjacent) resource allocation sizes could overlap.

In one further exemplary embodiments of the invention the value of the integer number n is chosen depending on the resource allocation size. Accordingly, for different resource allocation types the granularity of the transport block size indices from which the transport block size indicator can choose could be different.

In addition or alternatively, according to another embodiment, the integer number n could also depend on the resource block group size. For example, the integer number n for specific resource allocation sizes could be chosen based on the resource allocation type of the resource allocation. If for instance, the resource allocation assigns always multiples number of r consecutive resource blocks (as it is for example the case for allocation type 0 in a LTE system), it may be assured that for resource allocation sizes being a multiple of r resource blocks, the transport block size indicator is selecting from subsets of non-consecutive transport block size indices comprising indices being multiples of n. In this example, one can consider the entire range of transport block size indices to be divided into subsets of non-consecutive transport block size indices, and the transport block size indicator is determining the transport block size index of the transport block depending on the resource allocations size, i.e. the resource allocation size determines from which subset the transport block size indicator is determining the transport block size index. The resource allocation size may be considered to determine the range of indices within the subset from which the transport block size indicator is selecting the transport block size index.

In another embodiment of the invention, the granularity of the range of transport block sizes from which the transport block size indicator determines the transport block size based on the determined transport block size index depends on the resource allocation size. Accordingly, it is for example possible to have different granularities in the transport block sizes applicable for different resource allocation sizes or resource allocation size ranges.

In one exemplary implementation, according to an exemplary embodiment of the invention, in case the resource allocation indicator indicates an odd (even) number of resource blocks allocated for the transmission of the transport block, the determination of the transport block size index determines an odd (odd) transport block size index, and in case the resource allocation indicator indicates an even (odd) number of resource blocks allocated for the transmission of the transport block, the determination of the transport block size index determines an even (even) transport block size index.

As indicated above, for some resource allocation sizes the transport block size indicator may also determine a transport block size index from a subset of consecutive indices. In this exemplary embodiment, the resource allocation size indicator for at least one resource allocation size of available resource allocation sizes is determining the minimum or maximum transport block size index of a subset of consecutive transport block size indices of all available transport block size indices as before. In contrast to the prior examples where the transport block size indicator has determined an index out of a set of non-consecutive indices, for the at least one resource allocation size of available resource allocation sizes, the transport block size indicator determines the transport block size index from the subset of consecutive transport block size indices corresponding to the transport block size of the transport block. Hence, for some (but not all) resource allocations sizes (or for a range of resource allocation sizes out of all resource allocation sizes), the transport block size indicator may determine a transport block size index from a subset of consecutive transport block size indices.

In addition, other embodiments of the invention relate to the operation of a transmitting apparatus that is determining the control channel information for a transmission of a transport block. Accordingly another embodiment of the invention relates to a method for transmitting a transport block and a related control channel in a mobile communication system. A transmitting apparatus, such as a base station of mobile terminal for downlink or uplink transmissions, respectively, is selecting—for a transport block to be transmitted—a combination of a transport block size and resource allocation size out of plural (predefined or configured) combinations of transport block sizes and resource allocation sizes, wherein the transport block sizes defined by said combinations for a given resource allocation size have non-consecutive transport block size indices. The combinations of transport block sizes and resource allocation sizes may be for example predefined in the communication system or may be configured by control signalling.

The transmitting apparatus further determines, based on the selected combination of transport block size and resource allocation size, a transport block size indicator indicative of an offset to the minimum transport block size index yielded by the resource allocation size of said selected combination, and transmits the transport block and a control channel comprising the transport block size indicator and a resource allocation size indicator indicative of the transport block size and resource allocation size of said selected combination.

In a further embodiment, the channel conditions are considered in the selection of the transport block size and resource allocation size selection. Accordingly, the transmitting apparatus is selecting the combination of a transport block size and resource allocation size for the transport block based on a channel quality parameter, e.g. a SINR measurement on the shared channel.

In addition or alternatively, in another exemplary embodiment, the combination of a transport block size and resource allocation size for the transport block is selected by the transmitting apparatus based on the size of a protocol data unit that is to be mapped to the transport block by the transmitting apparatus.

In one further embodiment of the invention k is the number of possible transport block sizes and m is the number of different transport block sizes predefined by said combinations for a given resource allocation size, and wherein the equation $k \leq m$ is satisfied.

Further embodiments of the invention relate to the realization of the methods described herein in hardware and software. Accordingly, one embodiment of the invention is providing a receiving apparatus for receiving a transport block in a mobile communication system. The receiving apparatus comprises a receiver unit for receiving a control channel comprising a transport block size indicator and a resource allocation size indicator for a transmission of a transport block destined to the receiving apparatus. Further, the receiving apparatus comprises a processing unit for determining a transport block size index based on the resource allocation size indicator and the transport block size indicator, wherein the resource allocation size indicator is determining the minimum or maximum transport block size index of a subset of non-consecutive transport block size indices of all available transport block size indices and the transport block size indicator determines the transport block size index from the subset of non-consecutive transport block size indices corresponding to the transport block size of the transport block, and an extraction unit for extracting the transport block from the shared channel based on the resource allocation size indicator defining the number of resource blocks used to transmit the transport block and based on the selected transport block size index indicating the size of the transport block.

Another embodiment of the invention relates to a computer-readable medium storing instructions that, when executed by a processor of a receiving apparatus, cause the receiving apparatus to receive a transport block in a mobile communication system, by receiving a control channel comprising a transport block size indicator and a resource allocation size indicator for a transmission of a transport block destined to the receiving apparatus, determining a transport block size index based on the resource allocation size indicator and the transport block size indicator, wherein the resource allocation size indicator is determining the minimum or maximum transport block size index of a subset of non-consecutive transport block size indices of all available transport block size indices and the transport block size indicator determines the transport block size index from the subset of non-consecutive transport block size indices corresponding to the transport block size of the transport block, and extracting the transport block from the shared channel based on the resource allocation size indicator defining the number of resource blocks used to transmit the transport block and based on the selected transport block size index indicating the size of the transport block.

Concerning the transmission side, a further embodiment of the invention is providing a transmitting apparatus for transmitting a transport block and a related control channel in a mobile communication system. This transmitting apparatus comprises a selection unit for selecting for a transport block to be transmitted from a combination of a transport block size and resource allocation size out of plural predefined combinations of transport block size and resource allocation size, wherein the transport block sizes predefined by said combinations for a given resource allocation size have non-consecutive transport block size indices, and a processing unit for determining, based on the selected combination of transport block size and resource allocation size, a transport block size indicator indicative of an offset to the minimum transport block size index yielded by the resource allocation size of said selected combination. Furthermore, the transmission apparatus comprises a transmitter unit for transmitting the transport block and a control channel comprising the transport block size indicator and a resource allocation size indicator indicative of the resource allocation size of said selected combination.

With respect to a software-implementation of the transmission-side concepts suggested herein, another embodiment of the invention relates to a computer-readable medium storing instructions that, when executed by a processor of a transmitting apparatus, cause the transmitting apparatus to transmit a transport block and a related control channel in a mobile communication system, by selecting for a transport block to be transmitted from a combination of a transport block size and resource allocation size out of plural predefined combinations of transport block size and resource allocation size, wherein the transport block sizes predefined by said combinations for a given resource allocation size have non-consecutive transport block size indices, determining, based on the selected combination of transport block size and resource allocation size, a transport block size indicator indicative of an offset to the minimum transport block size index yielded by the resource allocation size of said selected combination, and transmitting the transport block and a control channel comprising the transport block size indicator and a resource allocation size indicator indicative of the resource allocation size of said selected combination.

BRIEF DESCRIPTION OF THE FIGURES

In the following, the invention is described in more detail in reference to the attached figures and drawings. Similar or corresponding details in the figures are marked with the same reference numerals.

DETAILED DESCRIPTION OF THE INVENTION

Figure 1:
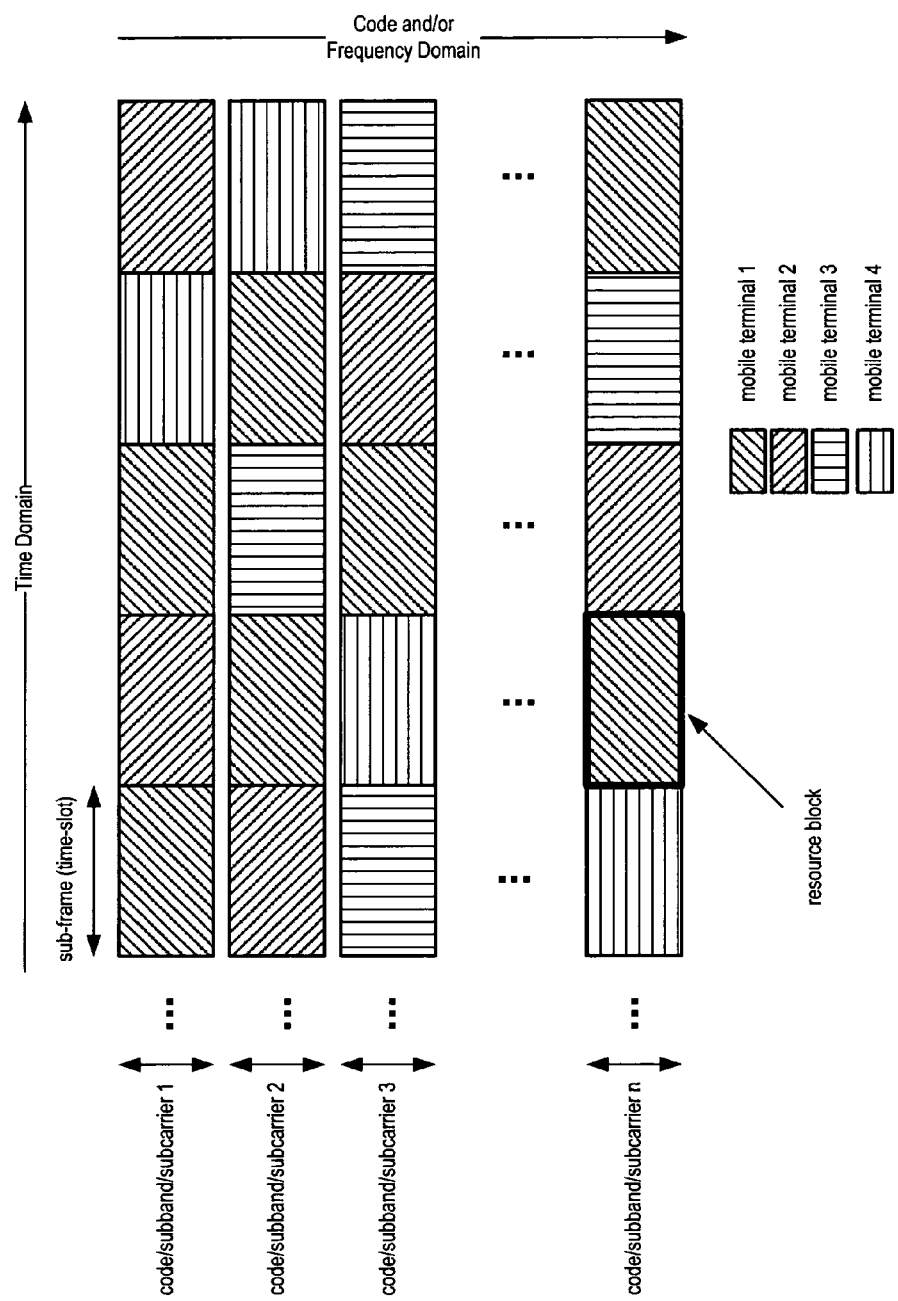
FIG. 1 shows an exemplary data transmission to users in an OFDMA system in localized mode (LM) having a distributed mapping of L1/L2 control signaling.

The following paragraphs will describe various embodiments of the invention. For exemplary purposes only, most of the embodiments are outlined in relation to an (evolved) UMTS communication system according to the SAE/LTE discussed in the Technical Background section above. It should be noted that the invention may be advantageously used for example in connection with a mobile communication system such as the SAE/LTE communication system previously described or in connection with multi-carrier systems such as OFDM-based systems, but the invention is not limited to its use in this particular exemplary communication network.

Before discussing the various embodiments of the invention in further detail below, the following paragraphs will give a brief overview on the meaning of several terms frequently used herein and their interrelation and dependencies. Generally, a protocol data unit may be considered a data packet of a specific protocol layer that is used to convey one or more transport blocks. In one example, the protocol data unit is a MAC Protocol Data Unit (MAC PDU), i.e. a protocol data unit of the MAC (Medium Access Control) protocol layer. The MAC PDU conveys data provided by the MAC layer to the PHY (Physical) layer. Typically, for a single user allocation (one L1/L2 control channel—PDCCH—per user), one MAC PDU is mapped onto one transport block (TB) on Layer 1. A transport block defines the basic data unit exchanged between Layer 1 and MAC (Layer 2). Typically, the when mapping a MAC PDU onto a transport block one or multiple CRCs are added. The transport block size is defined as the size (number of bits) of a transport block. Depending on the definition, the transport size may include or exclude the CRC bits.

In general, the transport format defines the modulation and coding scheme (MCS) and/or the transport block size, which is applied for the transmission of a transport block and is, therefore, required for appropriate (de)modulation and (de)coding. In a 3GPP-based system as for example discussed in 3GPP TR 25.814, the following relationship between the modulation and coding scheme, the transport block size and the resource allocation size is valid:

$$TBS = CR \cdot M \cdot N_{RE} \qquad \text{Equation 1}$$

where $N_{RE}$ is the number of allocated resource elements (RE)—one RE being identical to one modulation symbol, plural resource elements form a resource block—, CR is the code rate for encoding the transport block, and M is the number of bits mapped onto one modulation symbol, e.g. M=4 for 16-QAM. The L1/L2 control signaling comprises a resource allocation field that is indicating the resource allocation size, i.e. the number of allocated resource blocks (RB), which comprises a certain number of resource elements. The information on the resource allocation contained in the resource allocation field is referred to as a resource allocation indicator herein. Depending on the implementation and design of the mobile communication system, such as LTE, different resource allocation types may be defined. Each resource allocation type may have a specific format (different from the other types) for indicating the allocated resources. For example, in case of implementing the invention in a 3GPP LTE system, the different resource allocation types (type 0, 1 and 2) as provided in 3GPP TR 36.213, "Physical layer procedures", version 8.1.0, section 7.1 may be used.

Due to this relationship described above, the L1/L2 control signaling may only need to indicate either the transport block size or the modulation and coding scheme. In case the modulation and coding scheme should be signaled, there are several options how to implement this signaling. For example, separate fields for modulation and coding or a joint field for signaling both, the modulation and coding parameters may be foreseen. In case the transport block size should be signaled, the transport block size is typically not explicitly signaled, but is rather signaled as a transport block size indicator that is mapped to a TBS index. The interpretation of the transport block size indicator to determine the actual transport block size may for example depend on the resource allocation size.

In the following, the transport format field on the L1/L2 control signaling is assumed to comprise an indication of the transport block size, a so-called transport block size indicator. However, for the implementation of the invention, it is not important whether this field is indicating the modulation and coding scheme or the transport block size, as long as the transport block size, or rather the TBS index may be determined from the information in the transport format field.

It should be further noted, that the transport block size for a given transport block typically does not change during transmissions. However, even if the transport block size is not changed, the modulation and coding scheme may change between transmissions, e.g. if the resource allocation size is changed (as apparent for the described relationship above).

It should be also noted that in some embodiments of the invention, for retransmissions the transport block size is typically known from the initial transmission. Therefore, the transport format (MCS and/or TBS) information (even if the modulation and coding scheme changes between transmissions) does not have to be signaled in retransmissions, since the modulation and coding scheme can be determined from the transport block size and the resource allocation size, which can be determined from the resource allocation field.

One main aspect of the invention is to suggest a new signaling scheme for the transport size of a transmitted transport block, as for example comprised in the transport format field of L1/L2 control signaling. Generally, it may be assumed that there is a predetermined or configured range (typically referred to as "superset" or "mother table") of transport block sizes for all possible resource allocation sizes and transport formats (i.e. modulation and coding schemes). These values of the superset can be addressed by indices. According to this main aspect of the invention, the transport block size index (out of this superset) is determined from a range of non-consecutive transport block size indices, wherein the range from which the transport block size index is determined is depending on the signaled resource allocation size.

Figure 6:
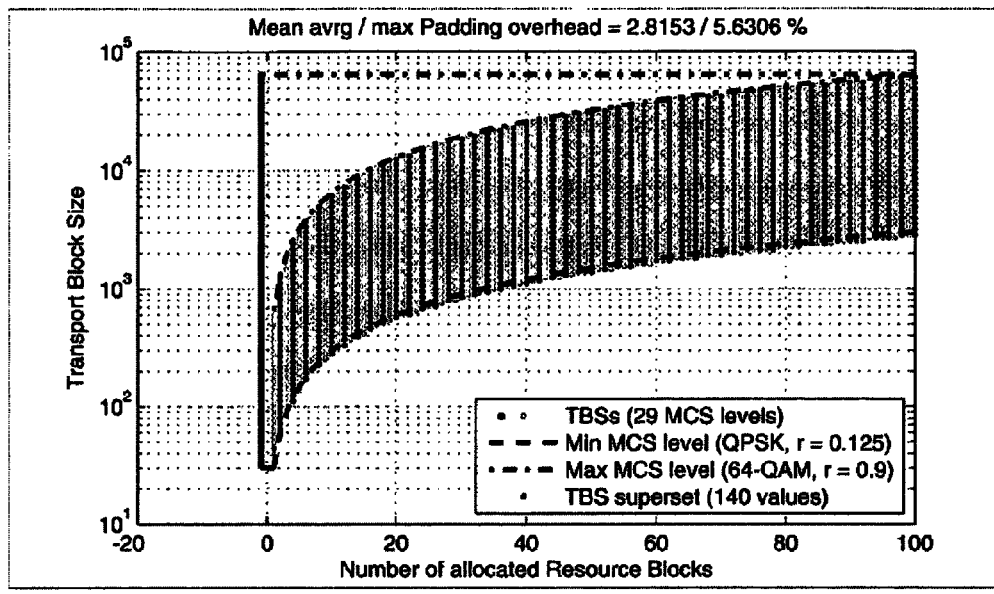
FIG. 6 shows an exemplary definition of a TBS superset and TBS range signaling with numbers being assumed for 3GPP LTE systems according to one exemplary embodiment of the invention, assuming a partitioning of the TBS superset indices into two subsets.
Figure 7:
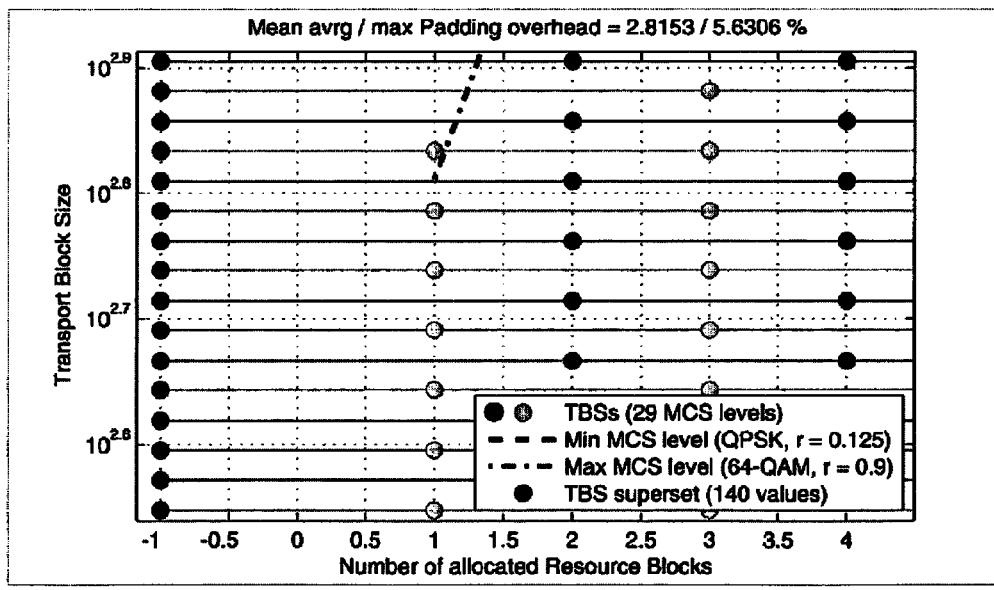
FIG. 7 shows a magnified view of a part of FIG. 6 to better highlight the partitioning of the TBS superset indices into two subsets.

As can be seen from FIG. 6 and FIG. 7, the minimum and maximum transport block size index typically depends on the resource allocation size, as the transmitting apparatus may only (be allowed to) use a certain range of modulation and coding scheme levels. For the lowest or highest modulation and coding scheme, a given resource allocation size thus yields a minimum and maximum transport block size due to the relations indicated Equation 1 above. Accordingly, the resource allocation size may be considered to define the minimum and/or maximum transport block size index that can be indicated by the transport block size indicator. Hence, the transport block size indicator may be considered to define the offset to the minimum or maximum transport block size index as determined by the resource allocation size. Thus in the most general definition, the transport block size index is the result of a function of the resource allocation size and the transport block size indicator.

In contrast to the prior-art solutions discussed in the Technical Background section, transport block size indicator is not directly indicating an offset choosing one transport block size index out of a subset of consecutive transport block size indices, but selects a transport block size index from a subset of non-consecutive transport block size indices. This allows increasing the number of transport block size indices and thus the number of available transport block sizes in the superset that can be used for the transmission of transport blocks without requiring additional overhead for the signaling of the transport block size as will be explained in further detail herein.

Generally, it is assumed that a superset of transport block size indices (corresponding to a superset of different transport block sizes) is defined or configured in the system. One approach how the invention can be implemented is to partition the indices in the superset into two or more subsets such that at least one of the subsets comprises non-consecutive transport block size indices (of the superset). The indices in the subsets may or may not overlap. In this approach the resource allocation size (as indicated by the resource allocation size indicator) is selecting one of the subsets and the transport block size indicator is mapped to a transport block size (index) of the subset determined by the resource allocation size.

In the probably simplest definition of two subsets, according to one embodiment of the invention, a first subset is generated from even transport block size superset indices ($2n$) and a second subset generated from odd TBS superset indices ($2n+1$), where the transport block size ranges for even resource allocation sizes (in terms of the number of allocated resource blocks) are generated from the first subset and the transport block size ranges for odd resource allocation sizes are generated from the second subset. in other words, the transport block size ranges for even and odd resource allocation sizes are generated from transport block sizes of the superset with the indices ($2n$) and ($2n+1$), respectively. In a similar fashion, the superset of transport block size indices may also be partitioned in three or more subsets. For instance, to partition the indices in three subsets, the $1^{st}$ subset could contain all indices $3n$, the $2^{nd}$ subset all indices $3n+1$ and the $3^{rd}$ subset all indices $3n+2$.

FIG. 6 shows an exemplary definition of a TBS superset and TBS range signaling with numbers being assumed for 3GPP LTE systems according to one exemplary embodiment of the invention, when applying the principles of the HSDPA signaling scheme in 3GPP TS 25.321 to a 3GPP LTE system and assuming a partitioning of the TBS superset indices into two subsets.

FIG. 7 shows a magnified view of a part of FIG. 6 to better highlight the partitioning of the TBS superset indices into two subsets. As can be best seen from FIG. 7, the first subset contains the even transport block size superset indices ($2n$) and the second subset contains the odd TBS superset indices ($2n+1$). Accordingly, if an odd resource allocation of size 1 or 3 is selected, the transport block size indicator is indicating a transport block size with an odd index. For an even resource allocation of size 2 or 4, the transport block size indicator is indicating a transport block size with an even index.

It should be noted that the subsets do not define the possible indices being signalled for a given resource block allocation size, but define the indices from which can be selected for a given resource block allocation size.

Another possibility is to align the partitioning of the superset of transport block size indices to the resource block group size or resource allocation type. For example, for resource allocation type 0 as defined in 3GPP TR 36.213, "Physical layer procedures", version 8.1.0, section 7.1, the resource group size is equal to four (for system bandwidths of 64-110 RBs). Accordingly, for resource allocation sizes of multiples of four, the transport block size indicator may selected from the same subset of transport block size indices. (All) other resource allocation sizes may be selected either from a single (other) subset of transport block size indices or from multiple (other) subsets of transport block size indices. Aligning the partitioning of the transport block size indices with resource allocation type 0 means that for all resource block allocation sizes of P·k (P being the resource block group size) the indices are selected from a single subset, e.g. subset 1.

The number of subsets does not necessarily need to be aligned with the resource block group size P. For example, the resource block group size P could be three and the number of subsets could be two. Then, e.g. for all allocation sizes of 3·k the indices are selected from subset 1 and allocation sizes of 3·k+1 and 3·k+2 are selected from subset 2.

In the examples above, the superset of transport block size indices is partitioned into different subsets and the resource allocation size is selecting the respective subset from which the transport block size indicator is selecting the transport block size index. This definition of subsets so as to contain based on transport block size indices being multiples of a given integer number (or two or more integer numbers) may constitute the simplest approach for partitioning the superset indices. Nevertheless also a more "complex" partitioning may be implemented. According to another embodiment, the subsets of transport block size indices from the superset of transport block size indices are defined for each resource allocation size differently, or for different resource allocation size ranges. Accordingly, to the extreme, there may be as many subsets as resource allocation sizes.

If the subsets are defined for individual ranges of resource allocation sizes, this could be realized as follows: For resource allocation sizes smaller or equal to a threshold number of resource blocks, the superset may be partitioned into two subsets, one subset comprising the even transport block size indices of the superset, the other subset comprising the odd transport block size indices of the superset. Accordingly, the transport block size indicator will determine a transport block size index from one of the two subsets according to the resource allocation size for resource allocation sizes smaller or equal to the threshold number of resource blocks, e.g. even resource allocation sizes are mapped to subset 1 and odd resource allocation sizes are mapped to subset 2. For resource allocation sizes larger than the threshold number of resource blocks, the transport block size indices of the superset may be partitioned according to the resource block group size or resource allocation type, as described above.

Furthermore, also the granularity of the transport block sizes in the respective subsets of subset indices may vary. For example, if a different number of subsets is defined depending on the resource allocation size ranges, the transport block size granularity of the superset may be different depending on the resource allocation size range. This is exemplified by the following MATLAB® code:

logTBS (1:n)=log 10(minTBS): diffLogTBS_1: log 10(medTBS);
logTBS (n:N)=log 10(medTBS): diffLogTBS_2: log 10(maxTBS);
TBS=10.^(logTBS);

According to this code the spacing of the TBS values in log-domain are different for different transport block size ranges. The spacing in log-domain defines the ratio of two adjacent transport block size values, e.g. TBS (n+1)/TBS(n), which is constant in a given transport block size or resource allocation range. The ratio in range 1 is then different from the ratio in range 2.

As indicated above, the partitioning of the transport block size indices in the superset into subsets of non-consecutive transport block size indices at least for range of resource allocation sizes, allows increasing the size of the TBS superset without requiring to spend more bits (and thus imply more overhead) for signaling the transport block size indicator. Therefore, the transport block size granularity can be increased.

Depending on how the transmitting apparatus is selecting transport block size and resource allocation size for the transmission of the transport blocks, the invention can reduce the MAC padding overhead significantly without additional signaling overhead in comparison to the prior-art described in the Technical Background section. Using a 5 bit transport block size indicator (and assuming 3 values being reserved) the L1/L2 control signaling scheme for a 3GPP LTE system as described previously herein can differentiate between 70 different transport block sizes which results in an average padding overhead of 5.8%. Using a partitioning of the transport block size indices into two subsets, one subset comprising the odd indices and the other subset comprising the even indices of the transport block size indices of the superset, the 5 bit transport block size indicator (while still reserving 3 values) can be used to differentiate 140 different transport block sizes, which can reduce the average MAC padding overhead to 2.8%.

Although the reduction of the MAC padding overhead is one advantage, there are further consequences to the control signaling. In order to reduce the MAC padding for a given MAC packet size, i.e. in order to select the most appropriate transport block size (closest larger TBS), only certain resource block allocation sizes are applicable. Hence, for a specific transport block size from a given transport block size subset, only selected resource block allocation sizes are available (e.g. for a transport block size from subset 1 chosen from the even transport block size superset indices only even resource block allocation sizes are possible)—or in other words, for a given resource block allocation size, only selected transport block size indices of the superset can be chosen.

In case of using Hybrid ARQ (HARQ) as a retransmission protocol and for situations where the transport block size should be signaled in the retransmission (typically the transport block size is known from the initial transmission, but the PDCCH of the initial transmission may be lost), the available resource block allocation sizes for the retransmission are limited to those allocation sizes for which the transport block size values are from the same transport block size subset (assuming that the subsets are distinct). It should be noted that a similar problem also exists in the prior art solution suggested in 3GPP TR 25.321 for HSDPA, where certain restriction of codes available for retransmissions exist.

Concerning the consequences on the selection of the transport block size in relation to the resource allocation size, this may be acceptable in systems designs like 3GPP LTE, if the number of subsets is reasonably small, i.e. the restriction of possible resource block allocations sizes for a certain transport block size is limited. However, the degree of this limitation in the selection of the transport block size/resource allocation size combinations depends on the resource block allocation size. For small resource block allocation sizes, the limitation may be acceptable, as a change of the resource block allocation size is not needed in most of the cases, since the benefit on system level is marginal. Even though, the resource block allocation size is desired to be changed for retransmissions, the restriction of the available resource block allocation sizes is acceptable. Another reason why this limitation could be acceptable for small resource block allocation sizes is that for transmitting the transport block size in retransmission is for HARQ robustness issues (as mentioned above). The system can simply operate without signaling the transport block size in retransmissions, which implies that the limitation in the selection of the transport block size/resource allocation size combinations is negligible. Since this affects only small transport block sizes, the overall system loss sue to lost packets (caused by unknown transport block size) is marginal.

For large resource block allocation sizes, in 3GPP LTE systems the scheduler typically assigns the resource blocks using allocation type 0. Consequently, also retransmissions are allocated with allocation type 0. Therefore, when aligning the partitioning to the resource block group size as described above, the transport block size can be signaled in retransmissions in a same/similar fashion as in prior art designs as defined in 3GPP TR 25.321 for HSDPA without a partitioning of transport block size indices in subsets.

Figure 8:
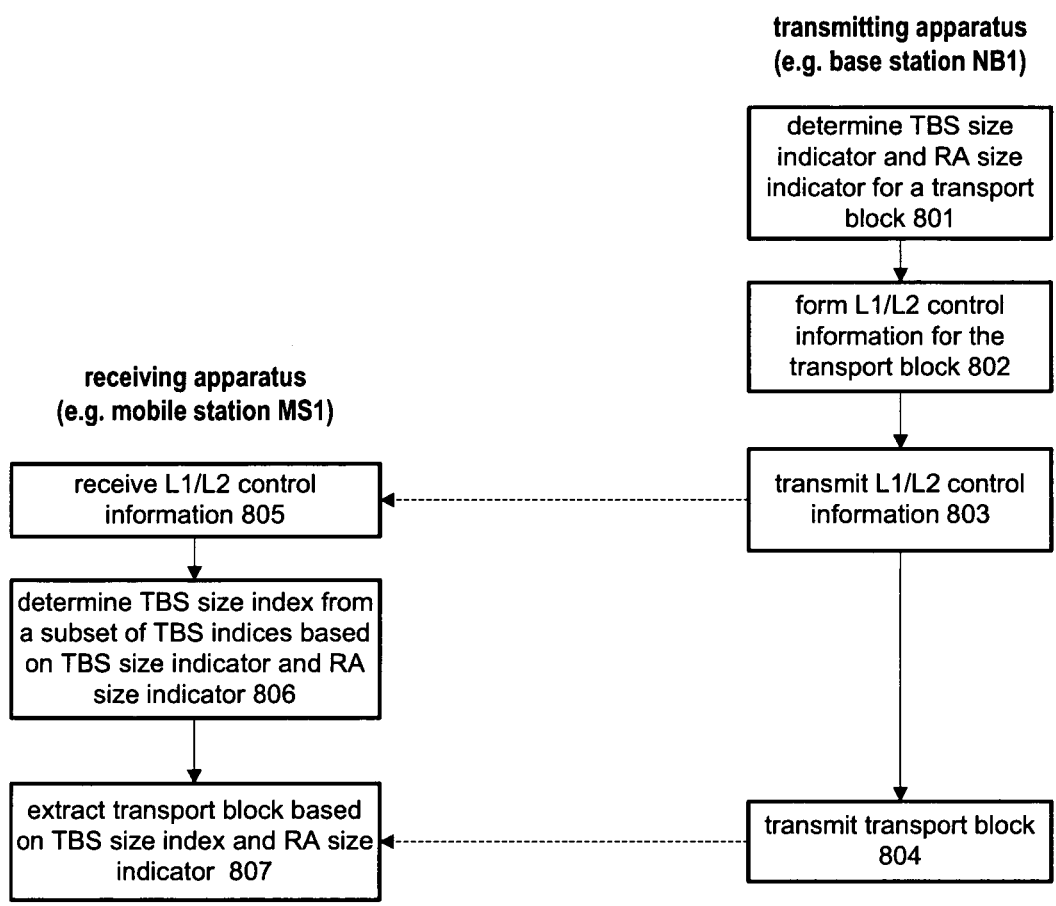
FIG. 8 shows a flow chart of the steps performed by a transmitting apparatus and a receiving apparatus according to an exemplary embodiment of the invention.

FIG. 8 shows a flow chart of the steps performed by a transmitting apparatus and a receiving apparatus according to an exemplary embodiment of the invention. Assuming that the transmitting apparatus is a base station or eNode B (e.g. NB1) and the receiving apparatus is a mobile station or user equipment (e.g. MS1), this embodiment illustrates the transmission of a transport block in the downlink.

Figure 9:
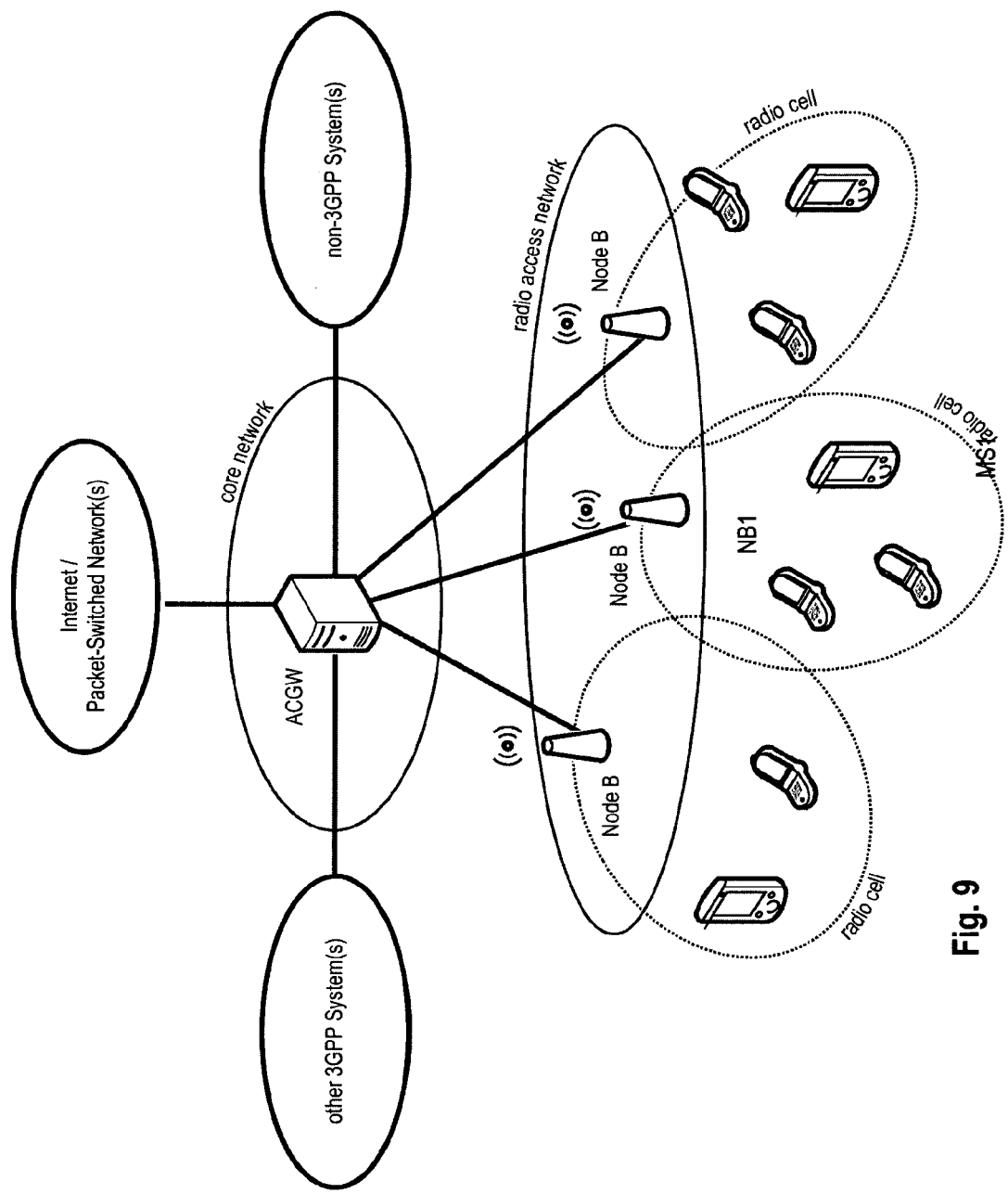
FIG. 9 shows a mobile communication system according to one embodiment of the invention, in which the ideas of the invention may be implemented.

For exemplary purposes, the transmitting apparatus and receiving apparatus may be assumed to be located in a network as exemplified in FIG. 9. The mobile communication system of FIG. 9 is considered to have a "two node architecture" consisting of at least one Access and Core Gateway (ACGW) and Node Bs. The ACGW may handle core network functions, such as routing calls and data connections to external networks, and it may also implement some RAN functions. Thus, the ACGW may be considered as to combine functions performed by GGSN and SGSN in today's 3G networks and RAN functions as for example radio resource control (RRC), header compression, ciphering/integrity protection.

The base stations (also referred to as Node Bs or enhanced Node Bs=eNode Bs) may handle functions as for example segmentation/concatenation, scheduling and allocation of resources, multiplexing and physical layer functions, but also RRC functions, such as outer ARQ. For exemplary purposes only, the eNodeBs are illustrated to control only one radio cell. Obviously, using beam-forming antennas and/or other techniques the eNodeBs may also control several radio cells or logical radio cells.

Figure 2:
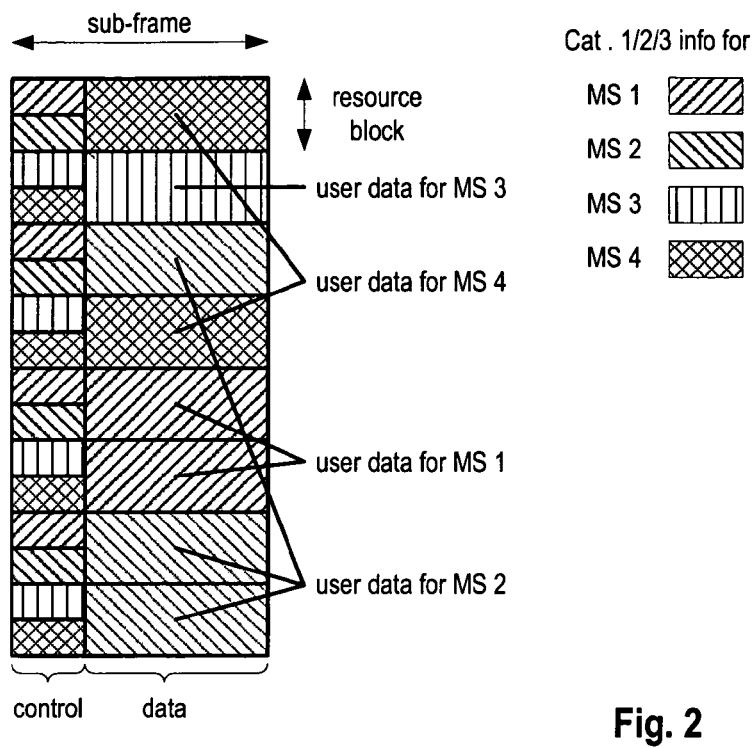
FIG. 2 shows an exemplary data transmission to users in an OFDMA system in localized mode (LM) having a distributed mapping of L1/L2 control signaling.
Figure 3:
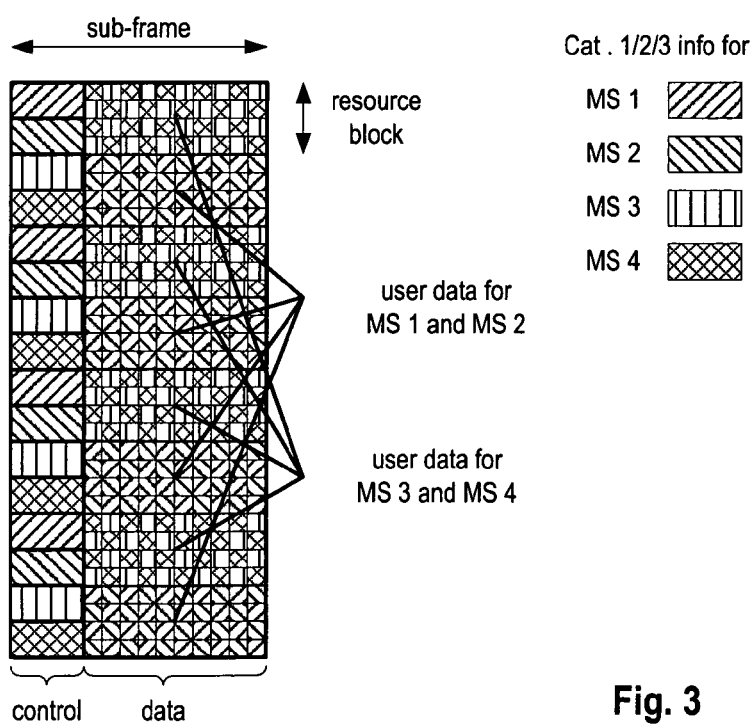
FIG. 3 shows an exemplary data transmission to users in an OFDMA system in distributed mode (DM) having a distributed mapping of L1/L2 control signaling, FIG. 4 exemplarily illustrates a simple example for TBS superset and TBS range signaling when applying the principles of the HSDPA signaling scheme in 3GPP TS 25.321.
Figure 4:
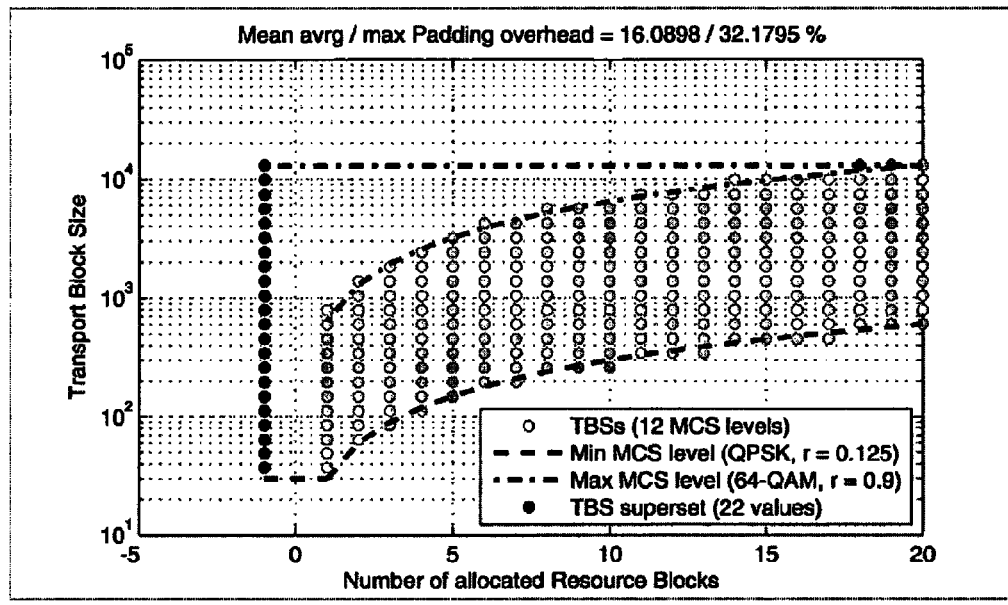
Figure 5:
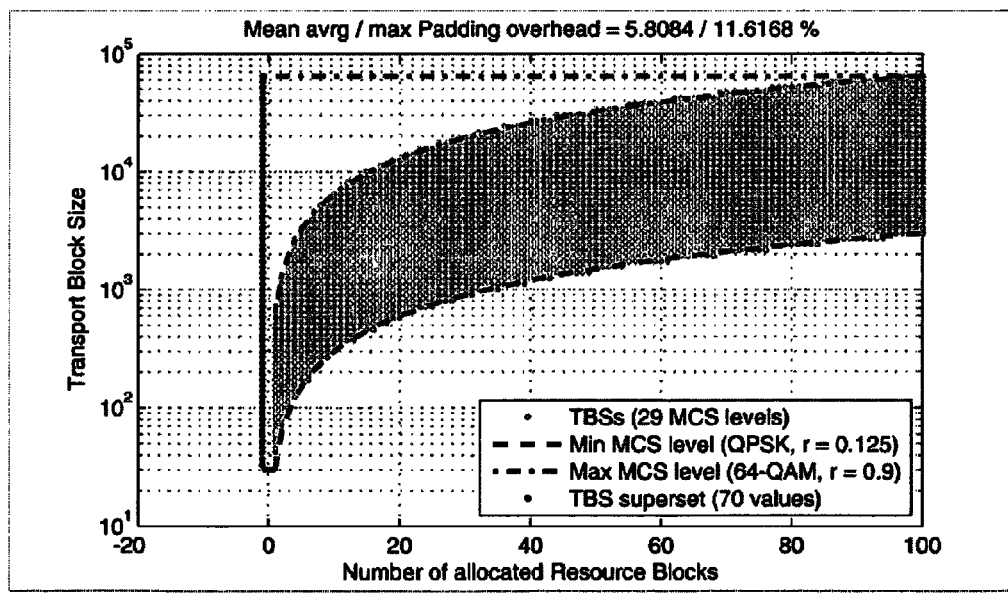
FIG. 5 shows another example for the definition of a TBS superset and TBS range signaling with numbers being assumed for 3GPP LTE systems when applying the principles of the HSDPA signaling scheme in 3GPP TS 25.321 to a 3GPP LTE system.

In this exemplary network architecture, a shared data channel may be used for communication of user data (in form or protocol data units) on uplink and/or downlink on the air interface between mobile stations (UEs) and base stations (eNodeBs). This shared channel may be for example a Physical Uplink or Downlink Shared CHannel (PUSCH or PDSCH) as know in LTE systems. However, it is also possible that the shared data channel and the associated control channels are mapped to the physical layer resources as shown in FIG. 2 or FIG. 3.

The control channel signals/information may be transmitted on separate (physical) control channels that are mapped into the same subframe to which the associated user data (protocol data units) are mapped or may be alternatively sent in a subframe preceding the one containing the associated information. In one example, the mobile communication system is a 3GPP LTE system, and the control channel signal is L1/L2 control channel information (e.g. information on the Physical Downlink Control CHannel—PDCCH). Respective L1/L2 control channel information for the different users (or groups of users) may be mapped into a specific part of the shared uplink or downlink channel, as exemplarily shown in FIGS. 2 and 3, where the control channel information of the different users is mapped to the first part of a downlink subframe ("control"). Generally, it should be noted that in one embodiment of the invention, the L1/L2 control channel (PDCCH) formats and contents are defined as in 3GPP TSG-RAN WG1 #52 Tdoc R1-081139, "PDCCH contents", February 2008.

The transport block is typically conveying data of a MAC PDU. Accordingly, it may be assumed that the transport block size to be used for transmitting a MAC PDU is chosen to be at least the same size as the PDU size. The MAC PDU is typically mapped to the transport block and, if the transport block size is larger than the MAC PDU size, padding bits are added to fill the transport block. Alternatively or in addition, padding bits may be added within the MAC PDU to fit the MAC PDU to the transport block size. Both, transmitting apparatus and receiving apparatus are (pre)configured with the same superset of transport block size indices and with information on the minimum and/or maximum transport block size (or transport block size index) for the respective applicable resource allocations. Both, transmitting apparatus and receiving apparatus maintain information on the partitioning of the superset of transport block size indices for the respective resource allocation sizes (or resource allocation size ranges) as discussed above. Accordingly, plural predefined combinations of transport block size and resource allocation size are known to transmitting and receiving apparatus. The combinations are configured such that for a given resource allocation size a subset of non-consecutive transport block size indices is applicable.

Figure 10:
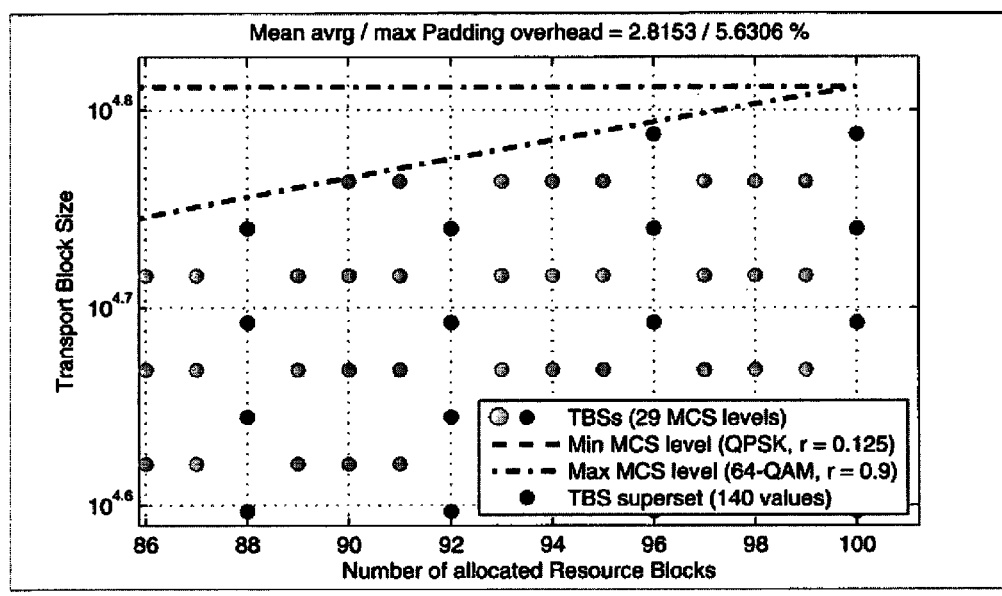
FIG. 10 shows a magnified view of another exemplary definition of a TBS superset and TBS range signaling with numbers being assumed for 3GPP LTE systems according to one exemplary embodiment of the invention, assuming a partitioning of the TBS superset indices into two subsets.

For example, when aligning resource block group size and partitioning with respect to resource allocation type 0, for a respective resource allocation size being a multiple of four resource blocks there exist combinations of the resource allocation size with respective indices out of a $1^{st}$ subset (subset 1) within an applicable range of transport block sizes spanning from the minimum to the maximum transport block size as given by the respective resource allocation size. Likewise, for the remaining respective resource allocation sizes there also exist respective combinations of resource allocation sizes and transport block size indices of a $2^{nd}$ subset (subset 2) in the applicable range of transport block sizes for the respective resource allocation size. For example, subset 1 of non-consecutive transport block size indices of the superset may be selected by resource allocation sizes being a multiple of four, while subset 2 containing non-consecutive transport block size indices of the superset could be selected by all other resource allocation sizes. This is exemplarily shown in FIG. 10.

Accordingly, when the transmitting apparatus is to transmit a MAC PDU, it is selecting 701 a combination of a transport block size and resource allocation size out of the plural predefined combinations of transport block size and resource allocation size for the transmission of the MAC PDU in a transport block. Besides the size of the MAC PDU to transmit, the selection of a combination of transport block size and resource allocation size may for example consider a channel quality measurement. For instance, the channel quality may for example require a low modulation and coding scheme for the transmission of the transport block, so that—in accordance with Equation 1—a respective resource allocation size must be foreseen to obtain a transport block size larger or equal to the MAC PDU size to be transported.

Having determined a combination of transport block size and corresponding resource allocation size (and thereby implicitly the modulation and coding scheme level), the transmitting apparatus is determining a transport block size indicator indicative of an offset to the minimum transport block size index yielded by the resource allocation size of said selected combination. The transport block size indicator and an indicator of the resource allocation size are added 702 to control information of a L1/l2 control channel by the transmitting apparatus.

Returning to the example above, where subset 1 contains even transport block size indices of the superset and is selected by resource allocation assigning an even number of resource blocks and subset 2 contains odd transport block size indices of the superset and is selected by resource allocation assigning an odd number of resource blocks, the relation between transport block size index of the superset and the transport block size indicator and resource allocation size indicator may be given by the following equation:

$$n_i = n_0(\text{numRB}) + 2n_{PDCCH} \quad \text{Equation 2}$$

where $n_i$ is the transport block size index of the superset indicating the transport block size; $n_0$ (numRB) is indicating the transport block size index of the minimum transport block size for the given resource allocation size (numRB) and is selected from the table 4 below; and $n_{PDCCH}$ denoting the transport block size indicator indicating a value in the range $[0, \ldots, M-1]$, where M denotes the number TBS values that can be differentiated by means of the transport block size indicator for the respective resource allocation size. The number of allocated resource blocks (numRB) is encoded in a resource allocation size indicator according to the given allocation type.

TABLE 4

| RB allocation size | $n_0$ (numRB) |
|---|---|
| 1 | 0 |
| 2 | 11 |
| 3 | 18 |
| 4 | 23 |
| 5 | 28 |
| 6 | 31 |
| 7 | 34 |
| 8 | 37 |
| ... | |

The transmitting apparatus transmits 703, 704 the L1/L2 control channel including the resource allocation size indicator and the transport block size indicator and the transport block to the receiving apparatus. For example, the L1/L2 control information is transmitted via the PDCCH (Physical Downlink Control CHannel) and the transport block via a shared downlink channel (PDSCH—Physical Downlink Shared CHannel) within a subframe as exemplarily shown In FIG. 1 or FIG. 2.

The receiving apparatus received 405 the L1/L2 control channel and extracts the control information to obtain the transport block size indicator and the resource allocation size indicator therefrom. Next the receiving apparatus determines 406 the transport block size index from a subset of transport block size indices based on transport block size indicator and resource allocation size indicator. Returning to the example above, this may be for example realized using equation 2 and table 4 above. Accordingly, the receiving apparatus is now aware of the transport block size of the transport block as well as the allocated number of resource blocks, which further implies a corresponding modulation and coding scheme level. Having obtained this information, the receiving apparatus can now extract 407 the transport block from the channel.

Generally, it may be assumed that within the communication system according to FIG. 8 a retransmission protocol, such as HARQ, is used between the transmitting apparatus and the receiving apparatus of the transport block is used on the MAC level that handles retransmissions of the protocol data unit conveyed by means of the transport block so as to ensure successful decoding of the data at the receiving apparatus. However, the operation of the retransmission protocol (HARQ) is not shown in FIG. 7. Nevertheless, it should be noted that the principles of the invention may also be applied to systems using a HARQ protocol. Accordingly, in one embodiment of the invention, the new interpretation of the control channel signaling with using a partitioning of the transport block size indices as proposed herein is used in a communication system using a control channel signaling as discussed on the co-pending application EP 07024829.9.

In most examples given before, the subsets are defined to be distinct, i.e. each respective transport block size index of the superset is only occurring in one of the subsets. According to another embodiment of the invention, the subsets are not distinct. For example, it may be ensured that specific transport block sizes are available in each subset. This may be advantageous to support certain service types, like Voice over IP (VoIP) services, where—in typical cases—specific transport block sizes are frequently encountered due to the voice codec settings. Accordingly, it may be desirable to be able to specify these specific transport block sizes irrespective of the resource allocation size.

The support of specific transport block sizes irrespective of the resource allocation size may be for example realized by including the transport block size index/indices of the specific transport block size/s to each subset. However, this may cause a more complicated definition of the relation between the respective transport block size indices and the respective transport block size indicators and resource allocation size indicators, as potentially no simple equation like in Equation 2 may be used to correlate the indicators and the transport block size indices. In general, instead of an equation, lookup tables may be (pre)defined to resolve the relation between the transport block size indicators/resource allocation sizes and transport block size indices.

Another possibility to support specific transport block sizes irrespective of the resource allocation size may be that the specific transport block sizes are each associated with plural transport block size indices such that it is ensured that an index for the transport block size is included in each subset. For example, using the example of building subsets consisting of even and odd indices respectively, it may be assured that selected transport block sizes have an odd index and an even index, so that they can be used for each of the resource allocation size. Typically, these transport block sizes are mapped onto consecutive indices of the transport block superset.

Similarly, these two basic approaches may also be used to allow for specific transport block sizes for given ranges of resource allocation sizes only.

In another embodiment of the invention, the mobile communication system may be operated at different system bandwidths. Hence, depending on the systems bandwidth the maximum number of resource blocks that can be allocated is varying. Accordingly, for different system bandwidths the resource block group (RBG) size is different, as indicated in table 3 above. Therefore, in one embodiment of the invention, the definition of subsets of the transport block size indices may be different for the respective resource block group sizes, i.e. system bandwidths, although the same transport block size superset is applicable. For example, for a given resource block allocation size the available transport block sizes may be different depending on the system bandwidths.

In another embodiment, the number of subsets may be selected according to the resource block group size. For example, for system bandwidths with 11-26 resource blocks where the resource block group size is two, the number of subsets for resource allocation sizes larger than a given threshold may also be two, while for resource allocation sizes smaller than or equal to the given threshold, the same number of subsets is defined irrespective of the system bandwidth.

It should be also noted that in FIGS. 4 to 7 a strict log spacing of the transport block sizes of the superset is shown. This is of course a desirable, ideal assumption but is typically not realistic. In practical systems, several parameters may influence the actually defined transport block sizes.

In accordance with another embodiment of the invention, one or more of the following parameters may be considered for defining the transport block sizes of the superset.

For example, the transport block sizes may be alignment to a certain (linear) granularity, e.g. byte alignment, such that the transport block sizes are multiples of 8 bits).

Further, in a 3GPP LTE system the transport blocks are subjected to turbo encoding by means of a turbo encoder. The turbo encoder is typically associated with a codeblock interleaver that is interleaving (consecutive) transport block(s) in junks of a given size, the codeblock size. Accordingly, it may be desirable to align the transport block sizes to the codeblock size of the codeblock interleaver, e.g. such that the transport block sizes are multiples of the codeblock sizes of the codeblock interleaver.

Another parameter to which the transport block size may be aligned is the CQI (Channel Quality Indicator) feedback (that is indicating a transport block size the reporting mobile station is assuming to support based on the channel quality measurements). This may be for example useful for efficient terminal performance testing. For example, in case the mobile terminal's CQI feedback is indicating that the mobile station can support a specific transport block size, which is however not defined in the superset of transport block sizes, the transport block sizes may be reconfigured based on the CQI feedback so that the indicated transport block size can be used (and tested).

It has also been indicated before, that the partitioning of the transport block size indices may depend on the resource allocation size. For instance, for resource allocation sizes with a number of resource blocks smaller than or equal to a threshold number of resource blocks, the superset of transport block size indices may not be partitioned (i.e. there is only one "partition"), while only for large resource allocation sizes larger than the threshold number of resource blocks, the of transport block size indices is partitioned in plural subsets of non-consecutive indices.

Furthermore, in the examples above, there is only one superset of transport block size indices defined. In another embodiment of the invention, there are different supersets defined depending on the resource allocation size. For instance, for a $1^{st}$ resource allocation size range, a $1^{st}$ superset of transport block size indices is defined, while a $2^{nd}$ superset of transport block size indices is defined for a $2^{nd}$ resource allocation size range/the remaining allocation sizes. Again, each of the two subsets may be partitioned into subsets containing non-consecutive indices of the respective superset that is applicable to a given resource allocation size. As before, the ranges for which the supersets are defined may be aligned with the RB group sizes depending on the system bandwidth as discussed above.

In some examples, the subset definition is dependent on the resource allocation type. As the respective allocation types may each have a respective control channel format (i.e. the resource allocation field in the L1/L2 control information has an allocation type dependent format), this may be also regarded equivalent to control channel (PDCCH) format depending subset definition.

Furthermore, most embodiments above have been specifically related to downlink transmissions. However, the principles herein are also applicable for uplink transmissions. When using the invention in a 3GPP LTE system, only specific uplink allocation sizes may be applicable. For instance, section 5.3.3 of 3GPP TS 36.211, "Physical channels and modulation", version 8.1.0 (available at http://www.3gpp.org and incorporated herein by reference), the uplink allocation size (number of resource blocks) must satisfy the equation:

$$RA\ size = 2^a \cdot 3^b \cdot 5^c \text{ with } a, b, c = 0, 1, 2 \qquad \text{Equation 3}$$

Accordingly, the subsets of the transport block size indices may be defined such that resource block allocation sizes satisfying equation 3 belong to the same subset, while those not satisfying equation 3 belong to another subset of transport block size indices. This relation of resource allocation size and subset may only be used for a specific resource allocation size range as discussed before.

Concerning the definition of the transport block sizes in general, the transport block sizes may be for example generated by means of an equation. For instance, the transport block sizes may be calculated using the equation:

$$TBS_n = \lfloor TBS_{min} p^k \rfloor \qquad \text{Equation 4}$$

where p=1.2, $TBS_{min}$=20 and n=1 ... N (and $TBS_0$=0). The resulting transport block sizes are indicated in table 5 below.

TABLE 5

| TBS index (n) | TB size [bits] |
|---|---|
| 0 | NULL |
| 1 | 20 |
| 2 | 24 |
| 3 | 28 |
| 4 | 34 |
| 5 | 41 |
| 6 | 49 |
| 7 | 59 |
| 8 | 71 |
| 9 | 85 |
| 10 | 103 |
| 11 | 123 |
| ... | ... |

Examples of mobile communication systems in which the principles of the invention outlined herein may be utilized are communication systems utilizing an OFDM scheme, a MC-CDMA scheme or an OFDM scheme with pulse shaping (OFDM/OQAM).

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Furthermore, it should be noted that the terms mobile terminal and mobile station are used as synonyms herein. A user equipment may be considered one example for a mobile station and refers to a mobile terminal for use in 3GPP-based networks, such as LTE.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

It should be further noted that most of the embodiments have been outlined in relation to a 3GPP-based communication system and the terminology used in the previous sections mainly relates to the 3GPP terminology. However, the terminology and the description of the various embodiments with respect to 3GPP-based architectures is not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently discussed by the 3GPP.

The invention claimed is:

1. A method for receiving a transport block in a mobile communication system, the method being performed by a receiving apparatus and comprising:
    receiving a control channel comprising a transport block size indicator and a resource allocation size indicator for a transmission of a transport block destined to the receiving apparatus,
    determining a transport block size index based on the resource allocation size indicator and the transport block size indicator, wherein the resource allocation size indicator determines the minimum or the maximum transport block size index of a subset of non-consecutive transport block size indices of all available transport block size indices and the transport block size indicator determines the transport block size index from the subset of non-consecutive transport block size indices corresponding to the transport block size of the transport block, and
    extracting the transport block from the shared channel based on the resource allocation size indicator defining the number of resource blocks used to transmit the transport block and based on the selected transport block size index indicating the size of the transport block.

2. The method according to claim 1, wherein the transport block size index is determined based on a function of the transport block size indicator and the resource allocation size indicator.

3. The method according to claim 2, wherein the transport block size indices of subsets of the transport block size indices for at least two adjacent resource allocation sizes overlap.

4. The method according to claim 1, wherein the transport block size index is determined from the subset of non-consecutive transport block size indices by adding an offset defined by the transport block size indicator to the minimum transport block size index of the subset of non-consecutive transport block size indices.

5. The method according to claim 4, wherein the offset is a multiple of an integer number n, where n>1.

6. The method according to claim 5, wherein the value of the integer number n depends on the resource allocation size.

7. The method according to claim 6, wherein the transport block size indices of subsets of the transport block size indices for at least two adjacent resource allocation sizes overlap.

8. The method according to claim 5, wherein the integer number n depends on the resource block group size.

9. The method according to claim 8, wherein the transport block size indices of subsets of the transport block size indices for at least two adjacent resource allocation sizes overlap.

10. The method according to claim 5, wherein the transport block size indices of subsets of the transport block size indices for at least two adjacent resource allocation sizes overlap.

11. The method according to claim 4, wherein the transport block size indices of subsets of the transport block size indices for at least two adjacent resource allocation sizes overlap.

12. The method according to claim 1, wherein the transport block size index is determined from the subset of non-consecutive transport block size indices by subtracting an offset defined by the transport block size indicator from the maximum transport block size index of the subset of non-consecutive transport block size indices.

13. The method according to claim 12, wherein the transport block size indices of subsets of the transport block size indices for at least two adjacent resource allocation sizes overlap.

14. The method according to claim 1, wherein the granularity of the range of transport block sizes from which the transport block size indicator selects the transport block size based on the determined transport block size index depends on the resource allocation size.

15. The method according to claim 14, wherein the transport block size indices of subsets of the transport block size indices for at least two adjacent resource allocation sizes overlap.

16. The method according to claim 1, wherein in case the resource allocation indicator indicates an odd number of resource blocks allocated for the transmission of the transport block, the determination of the transport block size index determines an odd transport block size index, and in case the resource allocation indicator indicates an even number of resource blocks allocated for the transmission of the transport block, the determination of the transport block size index determines an even transport block size index.

17. The method according to claim 16, wherein the transport block size indices of subsets of the transport block size indices for at least two adjacent resource allocation sizes overlap.

18. The method according to claim 1, wherein in case the resource allocation indicator indicates an even number of resource blocks allocated for the transmission of the transport block, the determination of the transport block size index determines an odd transport block size index, and in case the resource allocation indicator indicates an odd number of resource blocks allocated for the transmission of the transport block, the determination of the transport block size index determines an even transport block size index.

19. The method according to claim 18, wherein the transport block size indices of subsets of the transport block size indices for at least two adjacent resource allocation sizes overlap.

20. The method according to claim 1, wherein the transport block size indices of subsets of the transport block size indices for at least two adjacent resource allocation sizes overlap.

21. The method according to claim 1, wherein a resource allocation size indicator for at least one resource allocation size of available resource allocation sizes is determining the minimum or maximum transport block size index of a subset of consecutive transport block size indices of all available transport block size indices and the transport block size indicator determines the transport block size index from the subset of consecutive transport block size indices corresponding to the transport block size of the transport block.

22. A method for transmitting a transport block and a related control channel in a mobile communication system, the method being performed by a transmitting apparatus and comprising:
selecting for a transport block to be transmitted from a combination of a transport block size and resource allocation size out of plural predefined combinations of transport block size and resource allocation size, wherein the transport block sizes predefined by said combinations for a given resource allocation size have non-consecutive transport block size indices,
determining, based on the selected combination of transport block size and resource allocation size, a transport block size indicator indicative of an offset to the minimum transport block size index yielded by the resource allocation size of said selected combination, and
transmitting the transport block and a control channel comprising the transport block size indicator and a resource allocation size indicator indicative of the transport block size and resource allocation size of said selected combination.

23. The method according to claim 22, wherein the combination of a transport block size and resource allocation size for the transport block is selected based on a channel quality parameter.

24. The method according to claim 22, wherein the combination of a transport block size and resource allocation size for the transport block is selected based on the size of a protocol data unit to be mapped to the transport block.

25. The method according to claim 22, further comprising the step of mapping a protocol data unit to the transport block.

26. The method according to claim 22, wherein k is the number of possible transport block sizes and m is the number of different transport block sizes predefined by said combinations for a given resource allocation size, and wherein the equation $k \leq m$ is satisfied.

27. A receiving apparatus for receiving a transport block in a mobile communication system, the receiving apparatus comprising:
a receiver section that receives a control channel comprising a transport block size indicator and a resource allocation size indicator for a transmission of a transport block destined to the receiving apparatus,
a processing section that determines a transport block size index based on the resource allocation size indicator and the transport block size indicator, wherein the resource allocation size indicator is determining the minimum or maximum transport block size index of a subset of non-consecutive transport block size indices of all available transport block size indices and the transport block size indicator determines the transport block size index from the subset of non-consecutive transport block size indices corresponding to the transport block size of the transport block, and
an extraction section that extracts the transport block from the shared channel based on the resource allocation size indicator defining the number of resource blocks used to transmit the transport block and based on the selected transport block size index indicating the size of the transport block.

28. A non-transitory computer-readable storage medium storing instructions that, when executed by a processor of a receiving apparatus, cause the receiving apparatus to receive a transport block in a mobile communication system, by:
receiving a control channel comprising a transport block size indicator and a resource allocation size indicator for a transmission of a transport block destined to the receiving apparatus, determining a transport block size index based on the resource allocation size indicator and the transport block size indicator, wherein the resource allocation size indicator is
determining the minimum or maximum transport block size index of a subset of non-consecutive transport block size indices of all available transport block size indices and the transport block size indicator determines the transport block size index from the subset of non-consecutive transport block size indices corresponding to the transport block size of the transport block, and
extracting the transport block from the shared channel based on the resource allocation size indicator defining the number of resource blocks used to transmit the transport block and based on the selected transport block size index indicating the size of the transport block.

29. A transmitting apparatus for transmitting a transport block and a related control channel in a mobile communication system, the transmitting apparatus comprising:
a selection section that selects for a transport block to be transmitted from a combination of a transport block size and resource allocation size out of plural predefined combinations of transport block size and resource allocation size, wherein the transport block sizes predefined by said combinations for a given resource allocation size have non-consecutive transport block size indices,
a processing section that determines, based on the selected combination of transport sport block size and resource allocation size, a transport block size indicator indicative of an offset to the minimum transport block size index yielded by the resource allocation size of said selected combination, and
a transmitter section that transmits the transport block and a control channel comprising the transport block size indicator and a resource allocation size indicator indicative of the resource allocation size of said selected combination.

30. A non-transitory computer-readable storage medium storing instructions that, when executed by a processor of a transmitting apparatus, cause the transmitting apparatus to transmit a transport block and a related control channel in a mobile communication system, by:
selecting for a transport block to be transmitted from a combination of a transport block size and resource allocation size out of plural predefined combinations of transport block size and resource allocation size, wherein the transport block sizes predefined by said combinations for a given resource allocation size have non-consecutive transport block size indices, determining, based on the selected combination of transport block size and resource allocation size, a transport block size indicator indicative of an offset to the minimum transport block size index yielded by the resource allocation size of said selected combination, and transmitting the transport block and a control channel comprising the transport block size indicator and a resource allocation size indicator indicative of the resource allocation size of said selected combination.

* * * * *